US008927042B1

(12) United States Patent
Silva Santos et al.

(10) Patent No.: US 8,927,042 B1
(45) Date of Patent: *Jan. 6, 2015

(54) TOXIC PHENOLIC COMPOUND REMOVAL BY SELECTIVE BINDING OF PHENOLIC COMPOUNDS USING SMART POLYMERS

(71) Applicants: Universidad de Talca, Talca (CL); Fundación Fraunhofer Chile Research, Santiago (CL)

(72) Inventors: Leonardo Silva Santos, Talca (CL); Victor Felipe Laurie Gleisner, Talca (CL); John Amalraj, Talca (CL); Veronica Carrasco-Sanchez, Talca (CL); Fabiane M. Nachtigall, Talca (CL)

(73) Assignees: Universidad de Talca (CL); Fundación Fraunhofer Chile Research (CL)

( * ) Notice: Subject to any disclaimer, the term of this patent is extended or adjusted under 35 U.S.C. 154(b) by 0 days.

This patent is subject to a terminal disclaimer.

(21) Appl. No.: 14/051,045

(22) Filed: Oct. 10, 2013

(51) Int. Cl.
*A23J 1/09* (2006.01)
*A23L 1/015* (2006.01)

(52) U.S. Cl.
CPC .................................. *A23L 1/0156* (2013.01)
USPC ............. 426/490; 426/521; 426/531; 426/11; 426/387

(58) Field of Classification Search
USPC ......................................................... 426/490
See application file for complete search history.

(56) References Cited

U.S. PATENT DOCUMENTS

| 6,251,951 B1 | 6/2001 | Emerson et al. |
| 2009/0130254 A1 | 5/2009 | Vuillaume et al. |

FOREIGN PATENT DOCUMENTS

WO    WO 98/17386    4/1998

OTHER PUBLICATIONS

WO2009016018: Compositions comprising polyphenol; Inventor: Krassimir Petkov Velikov; Publication date: Feb. 5, 2009.*

* cited by examiner

*Primary Examiner* — Patricia George
(74) *Attorney, Agent, or Firm* — Merchant & Gould P.C.

(57) ABSTRACT

The present invention corresponds to a method for the removal of unwanted toxic phenolic compounds such as a pesticide from foodstuffs, more particularly beverages. The method comprising contacting a selected polymer with the foodstuff. In a particular embodiment, the polymers are selected among polyaniline (PANI), polyaniline emeraldine base (PANI-EB) and polyaniline emeraldine salt (PANI-ES) polymers, or the polymers are selected among polyamidoamine (PAMAM) dendrimers functionalized with polyaniline (PANI), polyaniline emeraldine base (PANI-EB) and polyaniline emeraldine salt (PANI-ES) polymers.

20 Claims, 3 Drawing Sheets

TOXIC PHENOLIC COMPOUND REMOVAL BY SELECTIVE BINDING OF PHENOLIC COMPOUNDS USING SMART POLYMERS

TECHNICAL FIELD

The present application is related to the field of treatment for removal of toxic compounds, more particularly pesticides, and more specifically, phenolic based pesticides. The invention corresponds to a composition, mainly comprising a specifically designed polymer, for selective adsorption of determined compounds. More specifically, the invention is directed to removal of pesticides that can be present in liquids, by application of the composition comprising the specifically designed polymer for removal of specific pesticides, more particularly, pesticides having a phenolic group in their structure.

BACKGROUND OF THE INVENTION

A pesticide is a substance or compound which is directed to the control, either by destroying or mitigating a pest. There are different kinds or classes of pesticides, and they can have synthetic origin, natural origin, or they can also be biological agents.

The use of pesticides is widely adopted worldwide and more particularly, they are routinely used in different crops, in order to control the different types of pests that can affect the production.

In the present invention, the focus is directed to organic compounds which can have a pesticide effect on a pest, such as fungi, bacteria, insects, nematodes, or other type of pest that can affect a particular crop, such as fruits, vegetables, nuts, or any other type of agricultural product.

More specifically, in the case of fruits, different kinds of pesticides are used, and the application of these compounds or agents, when water soluble pesticides are considered, is through the use of oils or waxes which allow the active ingredient (pesticide) to remain attached to the fruit even when water is used for irrigation, or when rain falls, in which cases a water soluble pesticide would be washed away, and its effect would be lost in the short term.

In the case when a wax or oil is used as an adjuvant for the application of a particular pesticide, these molecules with biocide activity remain present in the fruit as it is harvested and further processed.

A particular case is the use of fruit products for industrial processing, such as in the case of natural juices or juice extracts or sauces, which consider the processing of the whole fruit. In this type of industrial processing scenario, when the whole fruit is processed, the pesticides that were present in the fruit coating will remain present in the final processed product, such as for example a juice or a fruit extract, tomato sauce, or even wine in the case of grapes treated with a pesticide.

Therefore, processing of liquid foodstuffs for removal of pesticides that can be present therein is an always present requirement and necessity in order to improve the safety of foodstuffs.

In this document, the description of the scope of the invention is usually exemplified by references to the wine industry, nevertheless, this must not be understood as a limitation of the invention to said industry, since the compounds, compositions and methods of the present invention can be applied to a wide variety of liquid foodstuffs or beverages. Therefore, the terms liquid foodstuff or beverage must be understood in their widest meaning, such as for example, but not limited to, fruit juices, plant juices or extracts, fermented beverages, alcoholic fermented beverages, such as wine, beer, cider, sparkling wine, ale, rye beer, chicha, sake, pulque; or distilled alcoholic beverages such as whisky, whiskey, vodka, korn, brandy, cognac, vermouth, pisco, armagnac, branntwein, singani, arak, ouzo, pastis, sambuca, grappa, orujo, aguardiente, ron, cachaga, tequila, mezcal, among many other liquid foodstuffs or beverages containing phenolic compounds which, depending on the requirements of the industry or the customer, should be removed from the liquid foodstuff or beverage.

A new area being developed is that of smart polymers that have many advantages and applications. Particularly, these smart polymers can be used to trap phenolic compounds with high selectivity according to the requirements of a particular industry. Other advantages that these polymers have is their easy synthesis and characterization in addition to being environmentally and biologically benign, easy to separate from the final product and a selectivity that can be altered by changing the functional group of the polymers.

One way to address the above problems is through the detection, quantification and removal of unwanted substances using smart polymers. The use of branched polymers as opposed to the traditional linear ones, on the removal of unwanted substances, could largely improve the efficiency and specificity of practices where traditional methods are employed.

The procedure employed for the development of these smart polymers consisted on the following: The identification of target phenolic compounds with biocide activity, the synthesis and chemical characterization of an array of smart polymers based on their potential binding capabilities against phenolic compounds, the screening of the interaction between the polymers and selected phenolic compounds via liquid chromatography and UV-Vis spectrometry, and testing of the polymers in real food matrices (e.g. wine).

Thus, the problem to be solved by the present invention is removing selectively unwanted compounds from a liquid foodstuff or beverage, with a high yield, and a broad working pH range, and the solution proposed in the present invention is providing compounds or compositions for selective adsorption of compounds which affect negatively the quality of a liquid foodstuff or beverage, or more particularly, resolving the problem of the presence of pesticides in the end product.

The present invention is directed to compounds which have shown that adsorb selectively specific phenolic compounds which are routinely used as pesticide, or more particularly fungicides.

In order to solve the proposed technical problem, different polymers were designed, tested, and screened which would have the higher selectivity and yield for a set of identified specific compounds. These polymers resulted to be specific forms of polyaniline, and polyamidoamine materials functionalized with polyaniline polymers.

Polyaniline is a conducting polymer formed by combination of aniline monomers. The polymerized aniline monomers can be found in different oxidation states, where the fully reduced state is known as leucoemeraldine, while the fully oxidized state is known as (per)nigraniline. The intermediate state, emeraldine, has two forms, one the emeraldine base (PANI-EB) is the neutral form, and emeraldine salt PANI-ES) is the protonated form. The use of polyaniline polymers has been primarily directed to semiconductive devices, or electric devices; its use in batteries or in the conversion of chemical energy to electrical energy, whereas the application of polyaniline materials in the food industry has been limited to the use of the compound as a sensor, for example for evaluating the toxicity of a food product.

Other part of the molecules considered in this present invention are dendrimers. The dendrimers correspond to a repetitively branched molecule based on polymers. A dendrimer is usually symmetric around its core and might adopt a spherical or ellipsoidal shape. There are high and low molecular weight dendrimers, depending on the amount and length of branches. These molecules are typically used as a core for a larger molecule which would have specific features and functions depending on the functional groups that can be added to the surface of a dendrimer.

Dendrimers can also be classified in terms of its generation. The generation corresponds to the number of repeated branching cycles that are performed during its synthesis. The higher the generation of a dendrimer, the higher the number of exposed functional groups in its surface.

In particular, the present invention is directed to polyamidoamine (PAMAM) dendrimers. The core of PAMAM is a diamine (commonly ethylenediamine), which is reacted with methyl acrylate, and then another ethylenediamine to make the generation-0 (G-0) PAMAM. Further cycles of reactions will then render higher PAMAM generations.

The use of PAMAM dendrimers has seen a wide variety of applications. For example, PAMAM materials have been used in pharmaceutical compositions as carriers, as substrate for analyses or detection of compounds, associated with nucleic acids for therapeutic purposes.

PRIOR ART

The food industry, and more particularly the liquid beverages food industry, has developed some alternatives for the control of pests, and as an alternative, different methods for the removal of pesticides that remain present in processed products, nevertheless, up to date, and to the best of the knowledge of the inventors, no composition is as selective as the compositions of the present invention.

For example, US patent document U.S. Pat. No. 6,251,951 describes the use aromatic aldehydes which have shown to be effective against pathogenic fungi in plants. These compounds, more particularly cinnamic aldehyde is known to show a low toxicity, nevertheless, its use as flavoring agent in different foodstuffs, such as for example gum, ice-cream or candies, and beverages, turn it unsuitable for using in grapes which will later be processed into wine, since its presence would affect the quality and bouquet of the end product.

WO1998017386 describes a method for removing pesticides and/or phytodrugs from alimentary liquids, from potable and superficial waters and from waste waters includes that such liquids are treated with chitin, or with alkyl and aryl derivative of cellulose, of hemicellulose, of chitin, of chitosan, of pectin and of pectolignincellulosic materials nevertheless, these type of molecules are not specific for particular phenolic compounds, and thus, cannot be assured that their use would have no effect on the quality of the end product, more particularly in the case of fine wines, wherein the combination of specific aromatic molecules is greatly responsible for its quality.

US20090130254 describes a process for removal of toxic or undesirable polyhalogenated compounds in beverages, especially in wine. The method described therein is directed to the elimination in wine, of toxic or undesirable polyhalogenated compounds, wherein the method includes a step of bringing the drink to be treated in contact with an adsorbent which is a food grade copolymer of aliphatic and non-aliphatic monomers, the aliphatic monomers being selected from: methylene, ethylene, propylene, butylene, acrylonitrile, methyl methacrylate, and the non-aliphatic monomers are taken from: ethylene terephthalate, ethylene naphthalate, methylene terephthalate, propylene terephthalate, butylene terephthalate. The present invention proposes the use of specifically designed molecules which are directed to phenolic compounds with biocide activity, not limited to halogenated compounds as is the case of US20090130254.

As can be seen from the prior art, the use of polyaniline polymers or polyamidoamine dendrimers functionalized with polyaniline polymers for removing selectively unwanted compounds from a beverage, such as for example phenolic compounds with pesticide activity, with a high yield, and a broad working pH range, has not previously addressed, and the alternative polymers previously used to this end, have lower yields and lower selectivity than the compounds described in the present invention.

In order to provide a clear description of the invention, only with the objective to better understand the invention, and in no case considering a limitation to the scope of the invention, a particular case will be addressed, wherein the present invention has to be shown effective for the removal of a particular pesticide.

In a very specific consideration, fenhexamid or N-(2,3-dichloro-4-hydroxyphenyl)-1-methyl cyclohexanecarboxamide, is a widely used chemical for the control of fungi in different crops. Of particular importance, fenhexamid is widely used for the control of *Botrytis cinerea* fungi in grapes. And as a consequence, fenhexamid has been found in wine products at higher than allowed levels.

Therefore, and confronted with no known alternatives for specific removal of phenolic toxic compounds, such as pesticides, the present invention is a solution for the removal of phenolic pesticides from liquid beverages or liquid foodstuffs, more particularly, for the removal of fenhexamid, and even more specifically, for the removal of fenhexamid from wine.

BRIEF DESCRIPTION OF THE INVENTION

Figure 1:
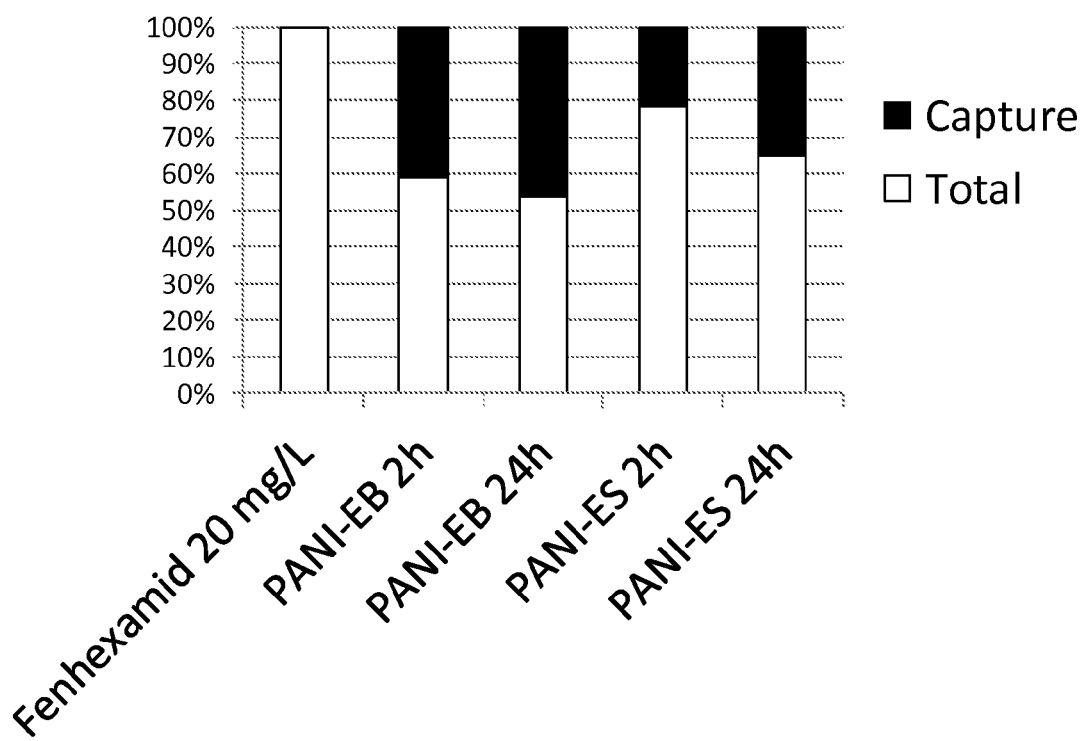
FIG. 1. Adsorption dynamics of fenhexamid in an ethanolic solution (12% vol/vol) using dendronized Polyaniline emeraldine base (PANI-EB) and dendronized Polyaniline emeraldine salt (PANI-ES) at pH 3.5.

The present invention is related to the use of compositions comprising specific polymers in food processing. More particularly, the compounds and/or compositions of the invention are useful in processing liquid foodstuffs or beverages, by selectively removing unwanted components. In a more particular case, the unwanted components correspond to phenolic compounds. More particularly, the present invention is directed to the removal of phenolic compounds with pesticide activity.

The compounds of the invention correspond to hyperbranched polyaniline (PANI) dendrimers, more particularly, 2 specific polyaniline polymer forms are considered part of the present invention: polyaniline emeraldine base (PANI-EB) and polyaniline emeraldine salt (PANI-ES).

The invention also comprises polyamidoamine (PAMAM) polymers functionalized with polyaniline (PANI) polymers.

DETAILED DESCRIPTION OF THE INVENTION

It has been found that PANI polymers, either PANI-EB or PANI-ES have interesting adsorption properties, specifically for determined phenolic compounds.

The present invention corresponds to a method or the use of PANI polymers, either PANI-EB or PANI-ES in the treatment of foodstuffs, more particularly for removing specific compounds from liquid foodstuff or beverages.

In a more specific embodiment, the use of PANI polymers in the method of the present invention is directed to the removal of specific phenolic compounds from fruit juices, plant juices or extracts, from alcoholic beverages such as wine or beer, and from distilled alcoholic beverages, or spirits.

In a more specific embodiment, the PANI polymers of the invention are selected in a range of molecular weight from 7 kDa to 150 kDa, more preferentially from 15 kDa to 70 kDa.

In a further embodiment of the present invention, functionalized polyamidoamine (PAMAM) dendrimers are considered. The PAMAM dendrimers are functionalized by adding PANI polymers to the external surface, and thus, increasing the potential contact of a single molecule of the invention with several phenolic compounds present in the foodstuff, or more preferentially a beverage.

In the present invention, PAMAM dendrimers of different generations are included in the scope of the invention. For instance, generation 0, 1, 2, 3, 4, 5, 6, 7 PAMAM are included in the scope of the invention.

In a further embodiment, PAMAM dendrimers of any considered generation are functionalized by adding PANI polymers to their surfaces. The functionalization of PAMAM dendrimers using polyaniline polymers is performed by using PAMAM polymers as capturing agents of PANIs to end the polymerization process, in the presence of a suitable persulfate salt, thus producing PAMAM-(PANI)n polymers.

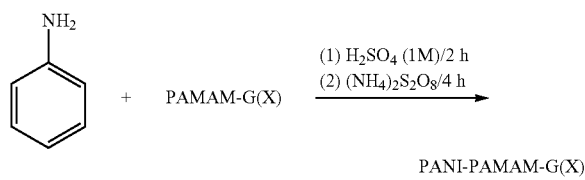

The present invention, as previously indicated, is directed to the use of PANI polymers or PAMAM-PANI polymers in the food industry, more specifically in the clarification of beverages, more particularly alcoholic beverages.

PANI polymers, as the ones described previously, can be used in different manners to allow the removal of unwanted molecules from particular beverages.

In one embodiment of the invention, the polymers of the invention (PANI-ES, PANI-EB, PAMAM-PANI-ES and PAMAM-PANI-EB) are added directly to the beverage to be treated. The polymer is added in a ratio from 0.5 mg/l to 4 mg/l, more preferentially from 1 mg/l to 2 mg/l, and the beverage is agitated for a period of time between 1 and 48 hours, more preferentially from 1 to 24 hours.

After the time period is completed, the polymer of the invention is separated from the beverage using standard industrial procedures, such as for example, decantation, sedimentation, filtration, and centrifugation.

On a different embodiment, the polymers of the invention (PANI-ES, PANI-EB, PAMAM-PANI-ES and PAMAM-PANI-EB) can be immobilized in a suitable matrix, allowing their use in a continuous mode. For example, the polymers of the invention can be immobilized in the matrix of a pre-filter, allowing the removal of unwanted molecules while the beverage is being subjected to filtration.

In a further embodiment, the polymers of the invention can be immobilized or can be conjugated with magnetic particles, allowing separation of the used polymers from the beverage using by magnetic means.

In yet another embodiment, the polymers of the invention can be immobilized in particles which can be used in a cartridge allowing removal of unwanted compounds from the beverage in a continuous process.

EXAMPLES

Example 1

Synthesis of Polyaniline

Polyaniline salt was prepared by aqueous polymerization technique. In a 250 ml round bottomed flask, 70 ml of deionized water was taken and 3 ml of concentrated $H_2SO_4$ was added slowly while stirring. To this mixture, 1 ml of aniline was added and the solution was kept under constant magnetic stirrer at 0-5° C. To this solution, 30 ml aqueous solution containing ammonium persulfate (2.9 g) was added for 10-15 min. duration. The reaction was allowed to continue for 6 h at ambient condition. The precipitated polyaniline salt was filtered and washed with deionized water, methanol and acetone to remove inorganic by-products and oligomers. The polyaniline powder was dried at 60° C. till a constant weight was reached.

Example 2

Preparation of Polyaniline Base

Polyaniline salt powder (1 g), obtained from the previous example, was treated with 100 ml of aqueous sodium hydroxide solution (1 M) for 8 h at ambient temperature. Polyaniline base powder was filtered and washed with excess amount of deionized water and finally with acetone and dried at 60° C. till a constant weight was reached.

Example 3

Preparation of Polyaniline PAMAM

One ml of aniline was dissolved in 30 ml of 1 M $H_2SO_4$ and kept under constant stirring at ambient condition. Then 0.2 g of PAMAM-Gx was added to aniline solution and stirred for 2 h. To this above mixture, 20 ml aqueous solution containing 3 g of ammonium persulfate (oxidizing agent) was added drop wise at 0° C. and the reaction mixture was agitated at ambient temperature for another 4 h. precipitated PANI-PAMAM-Gx (x=0-5) was filtered and washed with deionized water, methanol and acetone to remove unwanted byproducts and oligomers. The polyaniline-PAMAM powder was dried at 60° C. till a constant weight was reached.

Example 4

Evaluation of PAN™-EB and PANI-ES Affinity with Fenhexamid

An affinity evaluation was performed considering an ethanolic solution (12% vol/vol) at pH 3.5. A calibration curve was constructed considering concentrations ranging from 0.625 to 20 mg/l of PANI-EB or PANI-ES.

It was found that the affinity, defined as how many molecules of fenhexamid a single molecule of the tested polymer can bind, was 168 for PANI-EB and 105 for PANI-ES. This means that for every molecule of PANI-EB 168 molecules of fenhexamid were bound, and for each molecule of PANI-ES, 105 molecules of fenhexamid were bound.

Example 5

Evaluation of Binding Dynamic in Ethanolic Solution, at 2 and 24 Hours

To an ethanolic solution (12% vol/vol) with fenhexamid 20 mg/l, 2 mg/ml of dendronized PANI-EB or dendronized PANI-ES were added, and the free fenhexamid was determined at 2 and 24 hours. The results are shown in FIG. 1, showing that by 2 hours contact, over 40% of fenhexamid was bound with PANI-EB and by 24 hours, nearly 50% of the fenhexamid was bound. In the case of PANI-ES, by 2 hours of contact nearly 30% of fenhexamid was bound and by 24 hours, nearly 40% of fenhexamid was bound.

Example 6

Evaluation of Fenhexamid Binding in Real Red Wine and White Wine Samples

A sample of red wine was used to construct a calibration curve for the determination of fenhexamid concentration in wine, from 0 to 200 mg/l.

The fenhexamid concentration was then determined using a ultrahigh-performance liquid chromatography considering the calibration curve with the mentioned concentration range.

Different concentrations of PANI-EB (A) and PANI-ES (B) (1, 2, 3, 4 mg/l) in red wine were added to red wine samples containing 20 mg/l fenhexamid. After 24 hours the final concentration of fenhexamid in red wine was determined. The plots shown in FIG. 2 (PANI-EB) and FIG. 3 (PANI-ES) were normalized to the concentration of fenhexamid determined in a control sample (no PANI-EB nor PANI-ES added).

Figure 2:
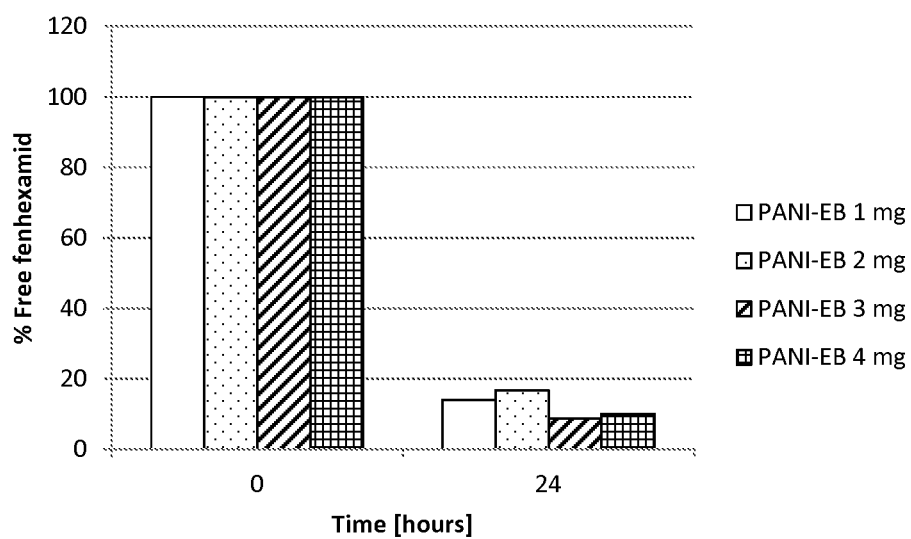
FIG. 2: Plot showing the decrease in free fenhexamid in a real red wine sample initially containing 20 mg/ml of fenhexamid, after 24 hours, when adding different concentrations of PANI-ES.
Figure 3:
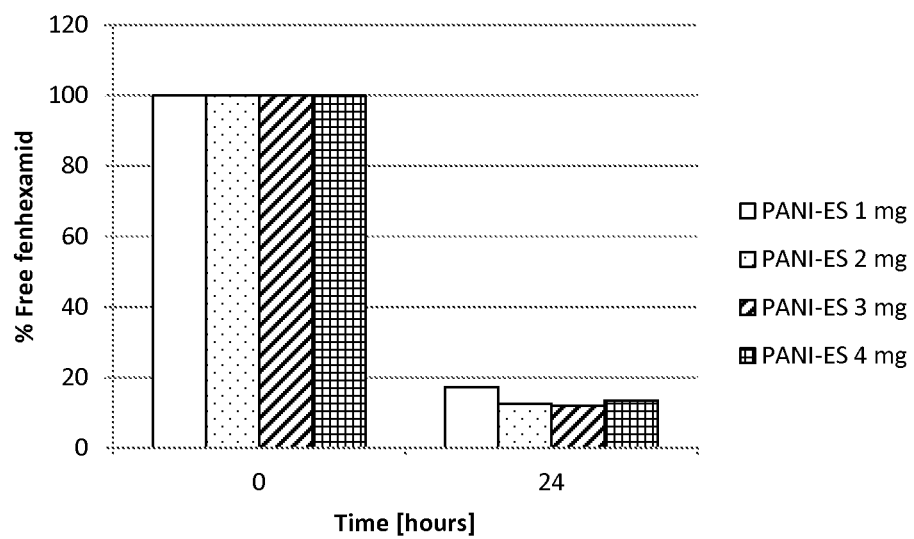
FIG. 3: Plot showing the decrease in free fenhexamid in a real red wine sample initially containing 20 mg/ml of fenhexamid, after 24 hours, when adding different concentrations of PANI-EB.

FIGS. 2 and 3 show a decrease in more than 80% of free fenhexamid in only 24 hours of contact, demonstrating that PANI-EB and PANI-ES are surprisingly good for removal of toxic materials, in particular fenhexamid, from wine.

The unique properties of PANI materials, in terms of ease of synthesis, insolubility in aqueous solutions, and high stability makes it an alternative to consider in the wine industry.

The invention claimed is:

1. A method for removing toxic phenolic compounds from a food or beverage, comprising:
    contacting the food or beverage with a fining agent selected from the group of polymers consisting of: polyaniline (PANI), polyaniline emeraldine base (PANI-EB) and polyaniline emeraldine salt (PANI-ES) polymers, wherein the fining agent removes the toxic phenolic compounds.

2. The method of claim 1, wherein the PANI, PANI-ES, or PANI-EB polymers are selected in a range of molecular weight from 7 kDa to 150 kDa.

3. The method of claim 1, wherein the PANI materials can be prepared by chemical oxidizing polymerization techniques such as aqueous, emulsion, interracial, or bulk polymerization techniques or electrochemical polymerization techniques.

4. The method of claim 1, further comprising protonating agents selected from inorganic acids and organic acids.

5. The method of claim 1, further comprising an oxidizing agent selected from the range of oxidizing agent such as ammonium persulfate, potassium persulfate, benzoyl peroxide, hydrogen peroxide etc.

6. The method of claim 1, wherein the PANI, PANI-ES, or PANI-EB polymers are selected in a range of molecular weight from 15 kDa to 70 kDa.

7. A method for removing toxic phenolic compounds from a food or beverage, comprising: contacting the food or beverage with a fining agent comprising polyamidoamine (PAMAM) dendrimers functionalized with a polymer selected from the group consisting of: polyaniline (PANI), polyaniline emeraldine base (PANI-EB) and polyaniline emeraldine salt (PANI-ES), wherein the fining agent removes the toxic phenolic compounds.

8. The method of claim 7, wherein the generation of the PAMAM dendrimer is selected among generation 0, 1, 2, 3, 4, 5, 6, or 7.

9. The method of claim 7, wherein the PAMAM dendrimers are functionalized with PANI, PANI-ES, or PANI-EB polymers selected in a range of molecular weight from 7 kDa to 150 kDa.

10. The method of claim 7, wherein the PAMAM dendrimers are functionalized with PANI, PANI-ES, or PANI-EB polymers are selected in a range of molecular weight from 15 kDa to 70 kDa.

11. The method of claim 1, wherein the polymer is added to the foodstuff in a ratio of 0.5 mg/l to 4 mg/l, and the beverage is agitated for a period of time between 1 and 48 hours.

12. The method of claim 1, wherein the polymer is immobilized in a matrix, allowing its use in a continuous mode.

13. The method of claim 12, wherein the matrix is a prefilter.

14. The method of claim 12, wherein the matrix is a set of magnetic particles.

15. The method of claim 12, wherein the matrix is a cartridge.

16. The method of claim 1, wherein the food or beverage is selected from the group consisting of: juice extract, a fermented alcoholic beverage, and a distilled alcoholic beverage.

17. The method of claim 16, wherein the fermented alcoholic beverage is selected from the group consisting of: wine, beer, and pulque.

18. The method of claim 16, wherein the distilled alcoholic beverage is selected from the group aguardientes consisting of whisky, vodka, brandy, vermouth, arak, ouzo, pastis, sambuca, rum, cachaça, tequila, and mezcal.

19. The method of claim 1, wherein the phenolic compound is a pesticide.

20. The method of claim 16, wherein the pesticide is fenhexamid.

* * * * *